US012163973B2

(12) United States Patent
Szasz et al.

(10) Patent No.: US 12,163,973 B2
(45) Date of Patent: Dec. 10, 2024

(54) MEASUREMENT SYSTEM FOR DETERMINING A PHYSICAL PARAMETER OF A PIPE-FLUID SYSTEM

(71) Applicant: ABB Schweiz AG, Baden (CH)

(72) Inventors: Paul Szasz, Plankstadt (DE);
Guruprasad Sosale, Munich (DE);
Joerg Gebhardt, Mainz (DE);
Sebastian Breisch, Neckarsteinach (DE); Thomas Stahl, Spechbach (DE);
Matthias Berning, Worms (DE);
Vadim Migunov, Ladenburg (DE)

(73) Assignee: ABB Schweiz AG, Baden (CH)

( * ) Notice: Subject to any disclaimer, the term of this patent is extended or adjusted under 35 U.S.C. 154(b) by 380 days.

(21) Appl. No.: 17/588,278

(22) Filed: Jan. 29, 2022

(65) Prior Publication Data

US 2022/0252494 A1 Aug. 11, 2022

(30) Foreign Application Priority Data

Jan. 29, 2021 (EP) ..................................... 21154207

(51) Int. Cl.
*G01N 9/00* (2006.01)
(52) U.S. Cl.
CPC .................................. *G01N 9/002* (2013.01)
(58) Field of Classification Search
CPC ............ G01N 9/002; G01N 2009/006; G01N 2291/014; G01N 2291/02818;
(Continued)

(56) References Cited

U.S. PATENT DOCUMENTS 5,321,991 A * 6/1994 Kalotay ................ G01F 1/8422
73/861.357
6,301,973 B1 10/2001 Smith
(Continued)

FOREIGN PATENT DOCUMENTS

CN 108644478 A 10/2018
CN 110745209 A 2/2020
(Continued)

OTHER PUBLICATIONS

Gao et al., "Vibration analysis and control technologies of hydraulic pipeline system in aircraft: a review," *Chinese Journal of Aeronautics*, 34(4): 83-114 (Aug. 13, 2020).
(Continued)

*Primary Examiner* — Tarun Sinha
(74) *Attorney, Agent, or Firm* — Leydig, Voit & Mayer, Ltd.

(57) ABSTRACT

A measurement system for determining a physical parameter of a pipe-fluid system includes a pair of confining elements configured to decrease surface vibration deformations at an outer surface of each end of the pipe-fluid system; wherein each confining element comprise a supporting frame configured to be detachably mounted on a pipe of the pipe-fluid system; and a fixation element configured to be detachably mounted for mechanically coupling the supporting frame with an outer surface of the pipe; an excitation system, configured to generate a mechanical vibration spectrum at a surface of the pipe-fluid system; and a vibration measurement device configured to be mechanically coupled to an outer surface of the pipe-fluid system, and configured to provide a mechanical vibration spectrum of the pipe-fluid system.

12 Claims, 5 Drawing Sheets

(58) Field of Classification Search
CPC ........ G01N 29/12; G01N 9/24; G01N 29/036; G01N 29/045; G01N 29/4472; G01N 29/46; G01N 11/00; G01N 29/22; G01N 29/223; G01N 29/32; G01N 29/326; G01N 29/42; G01N 2011/0073; G01N 2291/022; G01N 2291/02836; G01N 2291/02872; G01N 2291/2634; F16L 55/0335; F16L 55/035; F16L 55/041; G01F 1/86; G01L 11/04

See application file for complete search history.

(56) References Cited

U.S. PATENT DOCUMENTS

| | | |
|---|---|---|
| 7,950,609 B2 | 5/2011 | Pothanikat et al. |
| 8,166,801 B2 | 5/2012 | Sinha |
| 2009/0084178 A1 | 4/2009 | Sinha |
| 2015/0212045 A1 | 7/2015 | Raykhman et al. |
| 2016/0025687 A1 | 1/2016 | Lubrano et al. |

FOREIGN PATENT DOCUMENTS

| | | |
|---|---|---|
| CN | 211899681 U | 11/2020 |
| DE | 3128496 A1 | 2/1983 |
| EP | 0088362 A1 | 9/1983 |
| WO | WO 2011/017355 A2 | 2/2011 |
| WO | WO 2014/124182 A2 | 8/2014 |
| WO | WO 2017/137856 A1 | 8/2017 |

OTHER PUBLICATIONS

Gravelle et al., "Damping of tubes due to internal two-phase flow," *Journal of Fluids and Structures*, 23(1): 447-462 (Apr. 1, 2007).

European Patent Office, Extended European Search Report in European Patent Application No. 21154207.1, 14 pp. (Oct. 25, 2021).

* cited by examiner

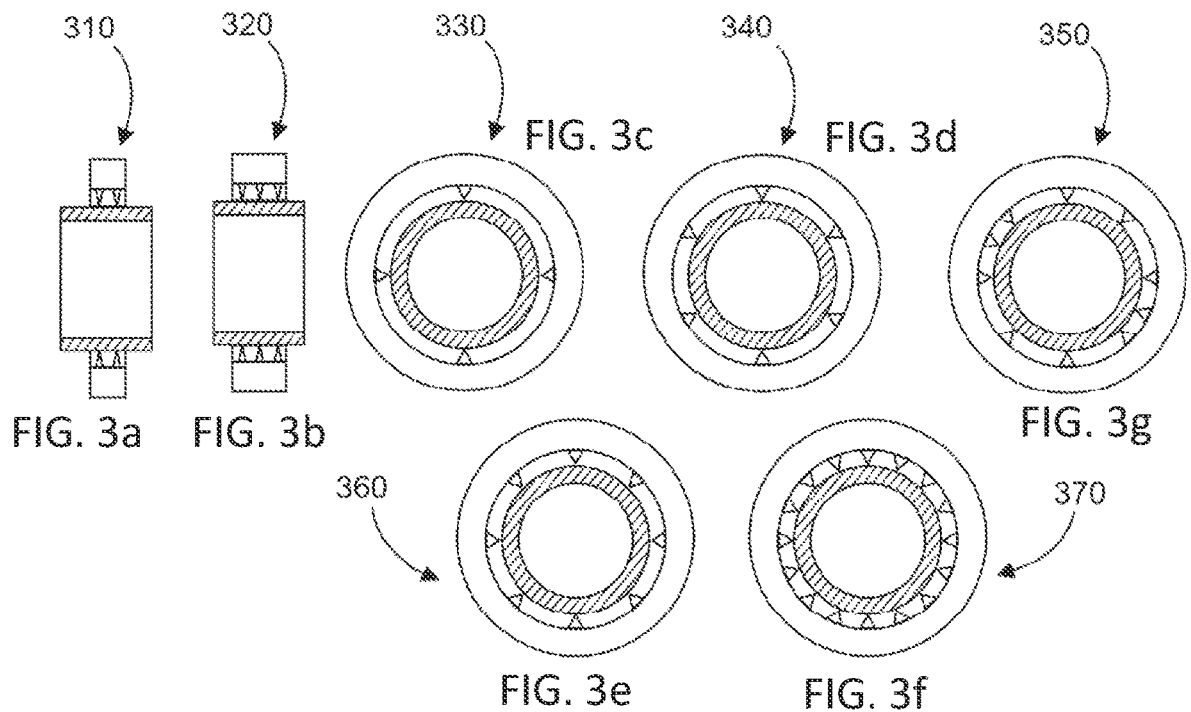
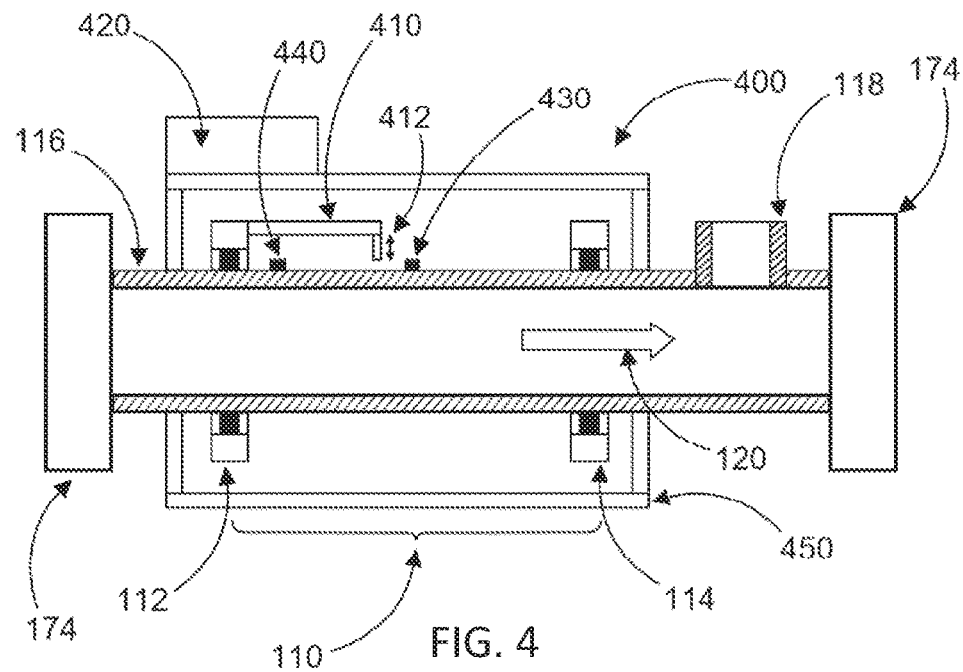

n=0 n=1 n=2 n=3 n=4 m=1 m=2 m=3 m=4

MEASUREMENT SYSTEM FOR DETERMINING A PHYSICAL PARAMETER OF A PIPE-FLUID SYSTEM

CROSS-REFERENCE TO RELATED APPLICATIONS

This patent application claims priority to European patent application no. EP 21154207, filed on Jan. 29, 2021, which is incorporated herein by reference.

BACKGROUND OF THE INVENTION

Density measurement is a valuable measurement in industrial processes, delivering relevant information on product and process quality. Most available density sensing systems are invasive, requiring the insertion of a device with fluid contact into the process, partly even intrusive, needing a member protruding into the flow. This leads to long installation times and need for process interruption at installation, causing high cost in case of retrofit additionally to the already high cost of the devices, e.g. Coriolis or vibrating fork sensors. The openings in the process piping created by insertion of an additional device also involve safety hazards of potential leakage, which are met with additional effort in sealing and safety measures.

For non-invasive measurements mostly nuclear radiation-based densitometers are used, in which the amount of radiation absorbed by a fluid is correlated to the density, using calibration and theoretical models. While this technology provides robust and accurate measurements even under harsh conditions, the radioactive hazards and high cost of using this equipment make it rather unpopular, limiting its use.

BRIEF SUMMARY OF THE INVENTION

A vibration characteristics of a given pipe-fluid system is dependent on numerous physical parameters, e.g. pipe wall thickness, diameter and length, material properties, fluid density, pressure, temperature, etc. Typically, a pipe of a pipe-fluid system has a wide variety of vibration modes, which depend on boundary conditions of the pipe as well as process conditions and/or changes of the process conditions of a fluid enclosed by the pipe. in order to determine a certain physical property, e.g. a density of the fluid of the pipe-fluid system, from the measured of mechanical vibrations of the pipe, all parameters and their influence on the vibrations must be known. If the required parameters are known with a sufficient accuracy, the frequency of the vibration mode, which is sensitive to a considered physical property, as e.g. a density of the fluid, can be determined by appropriate model calculations, at least within an accuracy of a few percent of the determined physical property. This prediction can be used to identify the relevant mode in a real vibration spectrum, even if its frequency deviates slightly from the predicted value due to tolerances in dimensions and material data.

The accuracy with which the frequency of a density sensitive mode can be predicted is essential for the determination of the physical property, in particular if it is based on a vibration measurement. The accuracy of this prediction depends on a quality of available information on parameters of the process, including temperature and pressure of a process fluid of the pipe-fluid system as well as geometry and material data of the pipe.

Process data like temperature and pressure are typically measured in industrial processes and the information can be available with a sufficient accuracy. Parts of the pipe geometry, as e.g. diameter and wall thickness, can be determined from a documentation of an installation of the pipe system and are typically constant along a processing line.

A pipe section length and the boundary conditions at the ends of any pipe section, however, have a large influence on a mechanical vibration spectrum, which is generated by a mechanical excitation. Sections of an industrial pipe can extend 10 cm to 20 cm or even several meters, their ends can be coupled to various flange types, with transitions incorporating wall thickness variations, conical flange transitions or butt-welded flanges or threaded connections. The large span of possible lengths can lead to a large variation of a measurement frequency resulting from a mechanical excitation of the mechanical vibration spectrum. In some cases, the resulting frequency of the mode sensitive to the physical property to be measured can be very low and can overlap with vibrations of the system originated by coupled machinery, thus making the distinction of the desired density influence difficult. In other cases, too high frequencies may lead to undesired high requirements towards the sensing equipment.

BRIEF DESCRIPTION OF THE SEVERAL VIEWS OF THE DRAWING(S)

The accompanying drawings, which are included to provide a further understanding of the invention and are incorporated in and constitute a part of this application, illustrate embodiments of the invention and together with the description serve to explain the principle of the invention.

FIG. 1 is a schematic drawing of a pipe-fluid system with confining elements attached to a pipe and respective vibration modes in accordance with the disclosure.

FIGS. 2a, 2b, 2c, and 2d are schematic drawings of different types of confining clamps in accordance with the disclosure.

FIGS. 3a-3f are schematic drawings of different types of confining clamps including discrete support points.

FIG. 4 is a schematic drawing of a measurement system for determining a physical parameter of a pipe-fluid system.

FIG. 6a is a schematic drawing of a confining clamp with two rows of discrete support points acting as a contact ring; FIG. 6b is a section view through the confining clamp of FIG. 6a.

FIG. 7a is a schematic drawing of a confining clamp with two rows of discrete support points acting as a contact ring, incorporating elastic elements; FIG. 7b is a section view through the confining clamp of FIG. 7a.

DETAILED DESCRIPTION OF THE INVENTION

Figure 1:
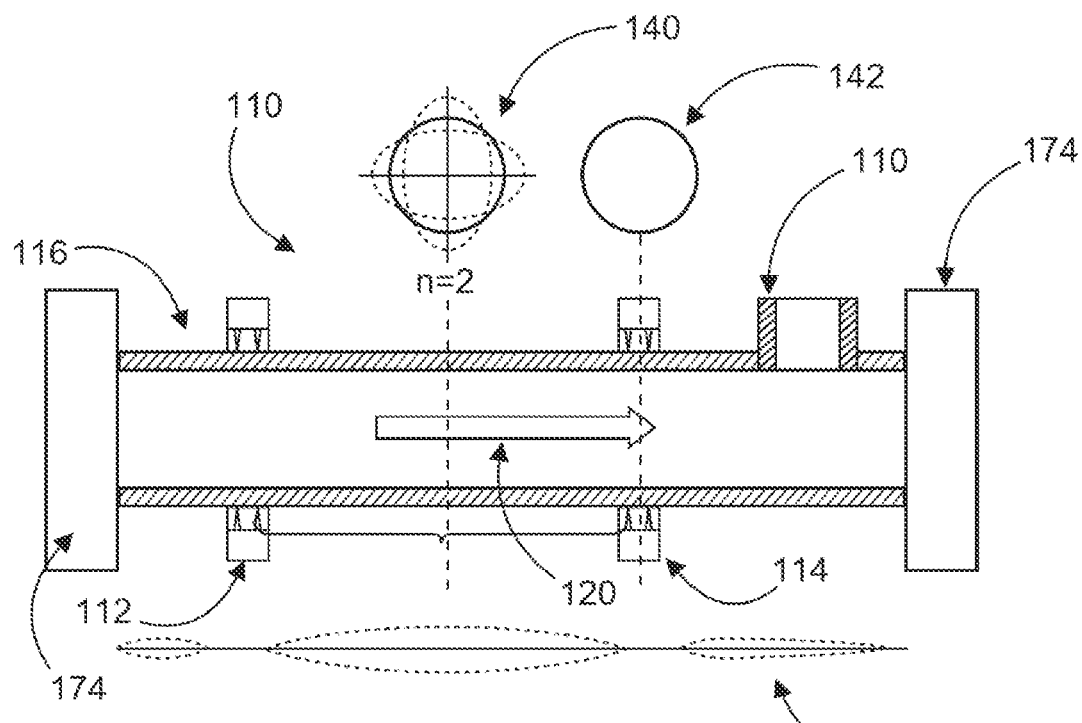
Figures 2A, 2B, 2C, 2D:
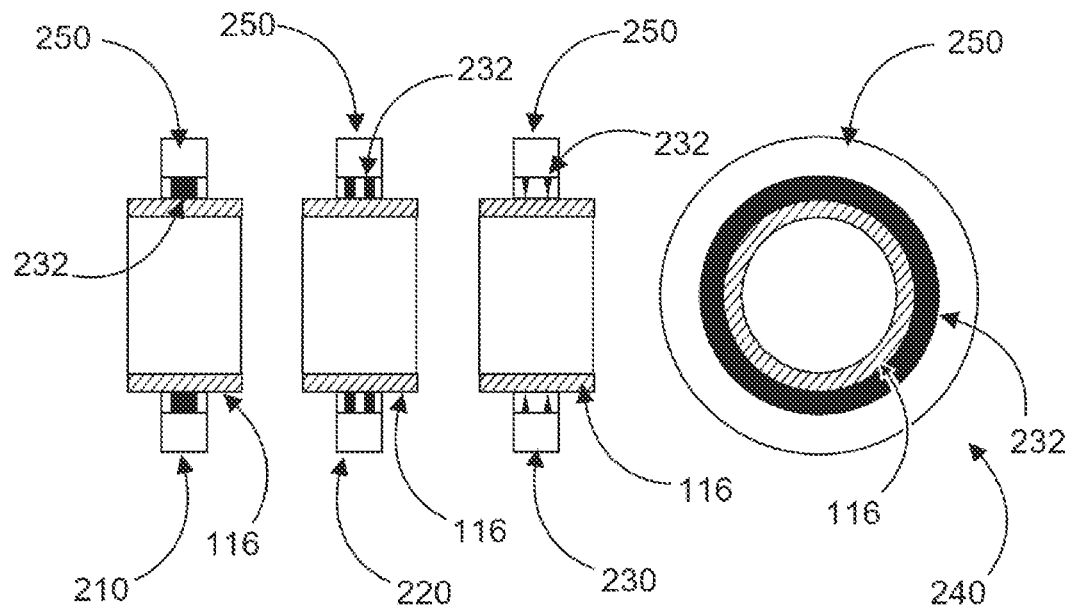

FIG. 1 sketches schematically a pipe-fluid system 110 including the pipe 116 and a flowing or resting fluid 120 at a section of the pipe 116 including a pipe junction 118, where confining elements 112, 114 are mechanically coupled to the pipe 116. This way a section of the pipe 116 is modified to build a pipe-fluid system 110 with a defined length between the two confining elements 112, 114 for vibration-based density sensing measurements, which is less sensitive to disturbances outside of the section. That means that the confining elements 112, 114 are configured to locally reduce vibrations at a location where they are coupled to the pipe 116, as indicated by the constant form of the pipe 142, if compared to the form of the pipe in the middle of the pipe-fluid system 140 during vibration. Respective vibration modes 140, 160 are indicated as an example. The modes are each characterized by the deformation of the pipe in two planes, which are perpendicular to each other. The circumferential deformations 140 and the longitudinal deformation 160. Any combination of these two deformation types is possible, being characterized by a combination of the characteristic numbers n and m, which are related to the number of vibrational nodes in the given plane. The examples refer to the combination n2m1, but other vibrational modes can be used to perform the determination of the physical parameter.

FIGS. 2a-2d are sketches of schematic examples of configurations of confining elements in form of longitudinal cross-sections 210, 220, 230 and a transversal cross-section 240 comprising continuous contact rings 232 mechanically coupled to the pipe 116 by a frame 250 surrounding the pipe, wherein the contact ring is configured as one ring comprising a defined width as included by the confining element 210; two narrow rings as included by the confining element 220; or two rings formed as cutting edge, as included by the confining element 230.

FIGS. 3a-3f are schematic example configurations of confining elements by longitudinal cross-sections 310 and 320 and transversal cross sections 330, 340, 350, 360 and 370, with fixation elements comprising various numbers and arrangements of discrete support pins, arranged e.g. in two rows 310 or three rows 320, equidistant arranged 330, 340, 360, 370 or irregular arranged 350, with a different number of support pins for mechanically coupling the frame of the confining element to the pipe of the pipe-fluid system. The frame of the confining element corresponds to the frame of the confining elements shown in FIGS. 2a-2d, carrying the fixation elements, like contact ring(s) or support pins in tight mechanically contact coupled to the pipe surface and to provide the stiffness needed to reduce mechanical vibrations at the mechanical coupling sites of the pipe.

FIG. 4 sketches schematically a measurement system 400 for a pipe 116 including confining elements 112, 114 to delimit a section of the pipe 116 for vibration measurement. The measurement system 400 includes an excitation system 412 for generation of mechanical vibrations, e.g. by an impact to the surface of the pipe 116. The excitation system 412 is coupled to a cantilever 410 to be mechanically decoupled from the pipe 116 within the pipe-fluid system 110. The measurement system 400 includes a vibration measurement system 430, as e.g. a vibration sensor and a temperature sensor 440 and a protective housing 450 covering the measurement section including the pipe-fluid system 110. The acceleration acquisition system 430 and the temperature sensor 440 are coupled by signals to a determination electronics 420. Outside of the segment of the pipe 116, which incorporates the pipe-fluid system 110 the pipe 116 is connected to a pipe junction 118 and to pipe flanges 174 at each side of the pipe 116.

Figure 5:
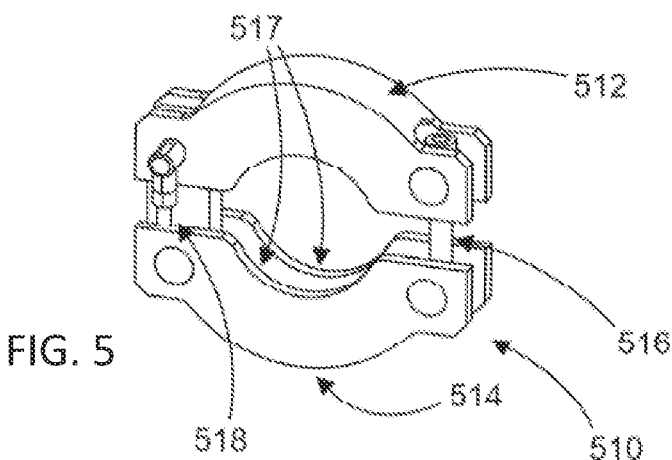
FIG. 5 is a schematic drawing of a confining clamp with a continuous contact ring.

FIG. 5 sketches schematically a confining element 510 including two continuous contact rings 517 to provide a double contact line configured to be mechanically coupled to the pipe 116. The confining element 510 includes two segments of a supporting frame 512, 514 configured to be coupled to the pipe 116 by the joining elements 516 and 518.

Figures 6A, 6B:
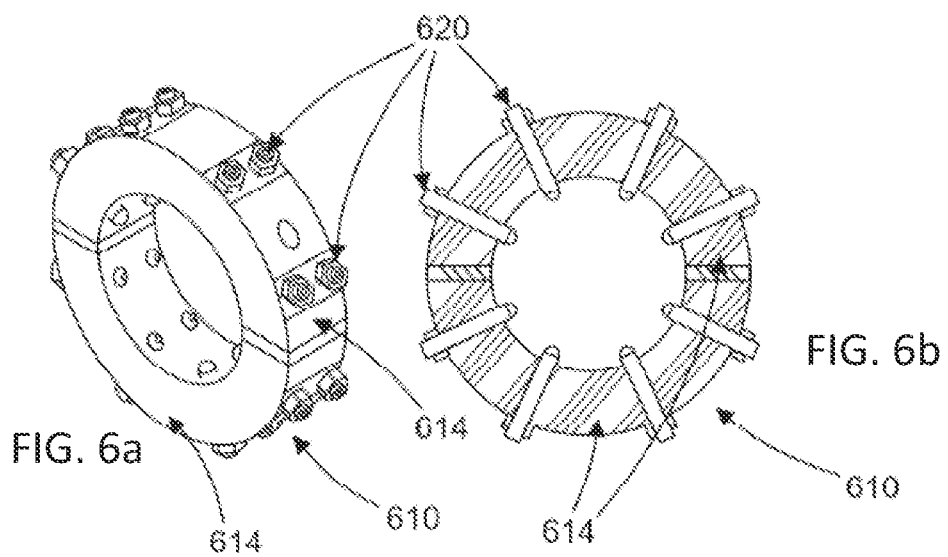

FIGS. 6a and 6b sketch schematically a confining element 610 in a perspective view (shown in FIG. 6a) and a transversal cross-section (shown in FIG. 6b) including two rows of discrete support points 620 acting as fixation element, configured to couple the supporting frame 614 to the pipe 116.

Figures 7A, 7B:
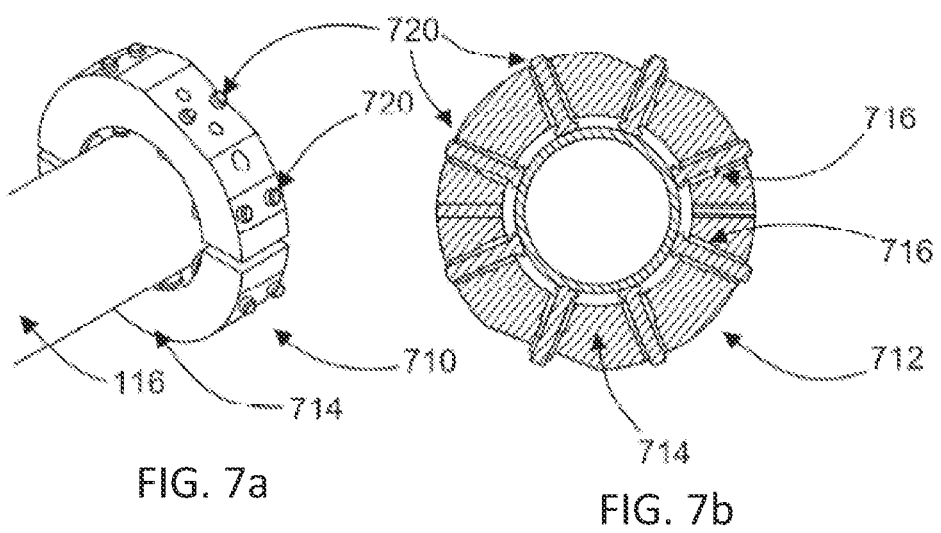

FIGS. 7a and 7b sketch schematically a confining element 710 which is shown in the respective view (FIG. 7a) and transversal cross-section (FIG. 7b) including two rows of discrete support points 720 acting as fixation element, configured to couple the supporting frame 714 incorporating elastic members 716, as e.g. springs, to compensate for thermal expansion differences, i.e. keeping forces of the mechanical coupling between the supporting frame 714 and the pipe 116 constant.

Figure 8:
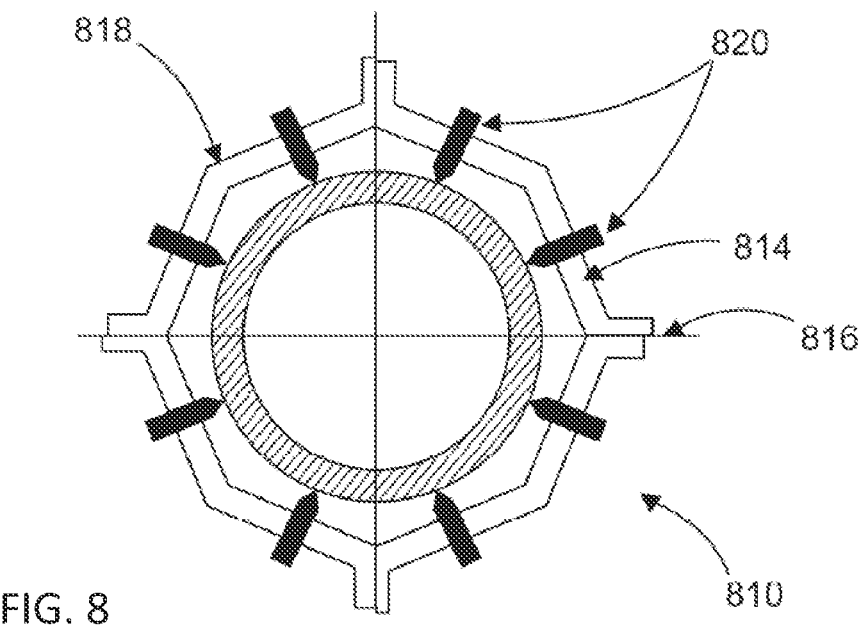
FIG. 8 is a schematic drawing of a confining clamp including a compliant frame.

FIG. 8 sketches schematically a confining element 810 including a compliant frame 818, i.e. a frame, which has a tailored bending stiffness with the purpose to enable a small compliance to thermal expansion differences, and still maintaining the required stiffness for vibration suppression. This tailored bending stiffness can be provided by the frame 814 by a specific form element 818 as shown in FIG. 8 and a selection of a material of the frame 814 and a thickness of the frame 814. The frame 814 is coupled to the pipe 116 by discrete support points 820 and the four segments of the supporting frame 814 are coupled by a joining element 816, as e.g. a screw joint.

Figure 9:
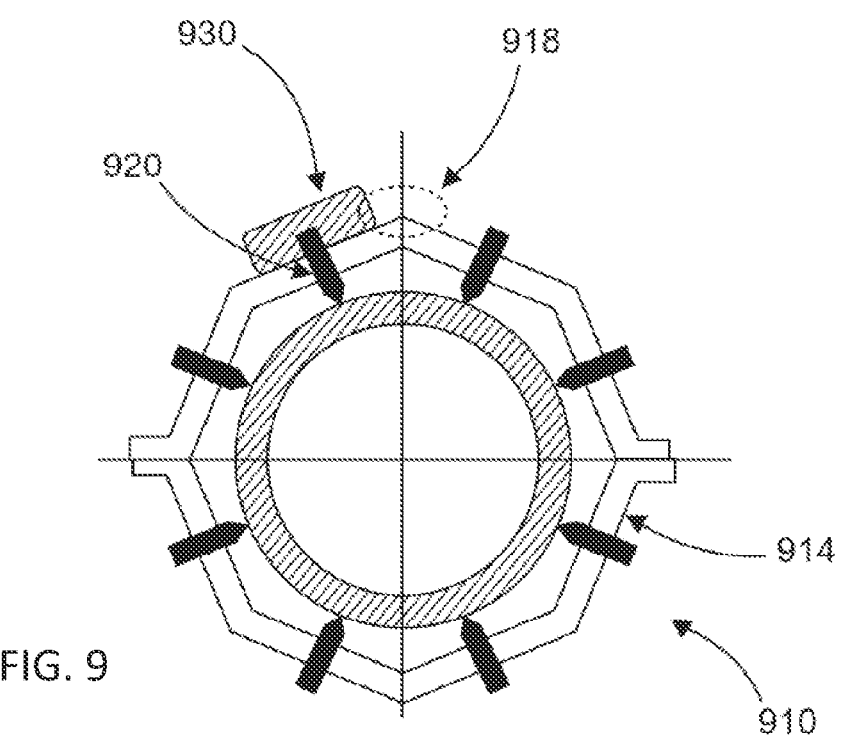
FIG. 9 is a schematic drawing of a confining clamp with a flexible frame having two frame segments and additional tuning masses.
Figure 10A:
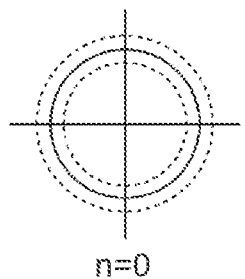
FIGS. 10a-10e are schematic drawings of circumferential vibration modes.
Figure 10B:
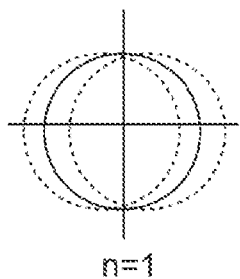
Figure 10C:
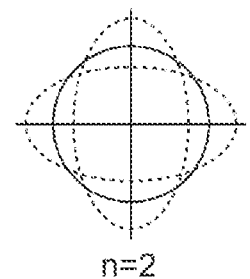
Figure 10D:
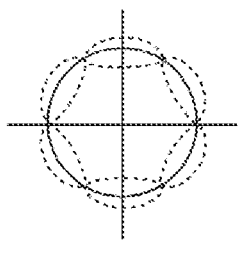
Figure 10E:
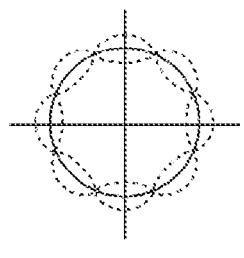
Figure 10F:
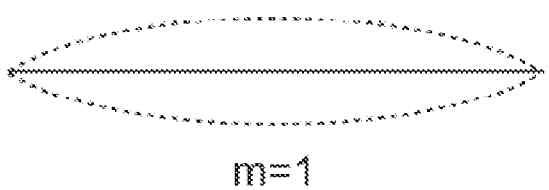
FIGS. 10f-10i are schematic drawings of axial vibration modes.
Figure 10G:
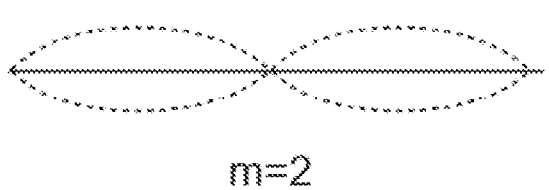
Figure 10H:
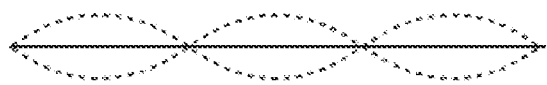
Figure 10I:
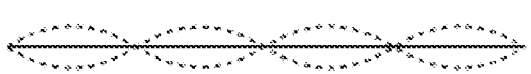

FIG. 9 sketches schematically a confining element 910, which is corresponding to the confining element 810 of FIG. 8, but having two segments of the supporting frame 914, which are configured to be flexible by a specific form element 918. Additionally the confining element 910 includes at least a tuning mass 930, which is mechanically coupled to a support point 920 to tailor the Eigen-frequency of the confining element 910 and so improve the local reduction of the pipe vibration. In FIG. 9 only one tuning mass is shown, which can be placed at each support pin 920 around the complete circumference of the support frame 914.

FIGS. 10a-10e sketch schematically circumferential vibration modes of a pipe, wherein the modes are indicated by a number and the numbers indicate an amount of nodes by: n=(number of nodes)/2.

FIGS. 10f-10i sketch schematically axial vibration modes of a pipe, wherein the modes are indicated by a number m and the numbers indicate an amount of nodes by: m=(number of nodes)−1.

The modes sketched by FIGS. 10a-10i can be generated within the section of the pipe-fluid system, which is defined by the confining elements mechanical coupled to the pipe.

The variety of boundary conditions, which might not be known accurately in advance, can additionally make a modeling and a measurement of relevant mechanical vibration modes difficult and inaccurate. E.g., welded seams can be non-uniform about their circumference and a resulting local variation of dimensions and material properties of a welded pipe can strongly influence excited vibration modes. Threaded pipe connections can have detrimental influence on the vibration, by causing undesired damping. Similarly, undesired damping can be introduced if pipe sections have local supports, attached cabling or clamped fixtures. All such design elements can cause severe vibration attenuation or frequency shifts and affect the accuracy of the predictive frequency modelling.

For these reasons, if frequency analysis of mechanical vibrations is used for a determination of physical parameters of the pipe-fluid system, it is highly desirable to control a length of a segment of the pipe that is used for determining a mechanical vibration spectrum and to control boundary conditions at both ends of the pipe section and along the length of the pipe section for measurement of the vibration. It is highly unrealistic to expect to find in any process system a pipe section with a length and boundary conditions corresponding to a need for a modelling of a vibration spectrum.

Aspects of the present invention are related to a measurement system for determining a physical parameter of a pipe-fluid system, a confining element, a kit of parts comprising the features of the measurement system and a use of a confining element with subject matter as described in the independent claims.

Advantageous modifications of the invention are stated in the dependent claims. All combinations of at least two of the features disclosed in the description, the claims, and the figures fall within the scope of the invention. In order to avoid repetition, features disclosed in accordance with the method shall also apply and be claimable in accordance with mentioned systems.

In this entire description of the invention, the sequence of procedural steps is presented in such a way that the process is easily comprehensible. However, the skilled person will recognize that many of the process steps can also be executed in a different order and lead to the same or a corresponding result. In this sense, the sequence of the process steps can be changed accordingly. Some features are provided with counting words to improve readability or to make the assignment more clear, but this does not imply the presence of certain features.

To achieve these and other advantages and in accordance with the purpose of the invention, as embodied and broadly described herein, there is provided a measurement system for determining a physical parameter of a pipe-fluid system, including:

a pair of confining elements configured to decrease surface vibration deformations at an outer surface of each end of the measurement system and/or the pipe-fluid system; wherein each confining element comprise:

a supporting frame configured to be detachably mounted on a pipe of the pipe-fluid system; and a fixation element configured to be detachably mounted for mechanically coupling the supporting frame with an outer surface of the pipe;

an excitation system, configured to generate a mechanical vibration spectrum on a surface of the pipe-fluid system; and a vibration measurement device configured to be mechanically coupled to an outer surface of the pipe-fluid system, and configured to provide a mechanical vibration spectrum of the pipe-fluid system.

According to an aspect, each of the confining elements is configured to solely suppress surface vibrations of the pipe of the pipe-fluid system at the location, where the confining element is mounted, preferably to determine and/or to define a vibration spectrum of a segment of the pipe, which is located between the pair of confining elements, preferably if a vibration spectrum is generated by an excitation system.

An expansion of the measurement system can be defined by a distance between the pair of confining elements, preferably a distance between the pair of confining elements can determine and/or define the vibration spectrum of the pipe-fluid system of the pipe, at a segment of the pipe, where the measurement system is located and/or mounted.

Each confining element can define and/or cause a local nodal point, leaving the rest of the pipe, preferably between the two confining elements, to vibrate with a correspondingly height of an amplitude, enabling a generation and/or measurement of a vibration spectrum and model-based correlation for determining physical properties of the fluid of the pipe-fluid system.

According to an aspect the confining elements are mounted to the pipe solely. That means, the confining elements do not mount and/or carry the pipe itself. The measurement system can be configured such, that the pipe is not fixed and/or mounted to the environment by the confining elements, but the confining elements are solely mechanically coupled to the outer surface of the pipe to define a local nodal point in respect to surface vibrations of the pipe at the location where the confining elements are mounted on the pipe, preferably the pipe of the pipe-fluid system.

The measurement system including a pair of confining elements, wherein the confining elements are configured to define a segment of a pipe of the pipe-fluid system for generation of a vibration frequency spectrum between the confining elements for frequency analysis of mechanical vibrations can determine physical parameters of the pipe-fluid system. That is, because the pair of confining elements can control a length of a segment of the pipe that is used for determining a mechanical vibration spectrum and to control boundary conditions at both ends of the section of the pipe and along the length of the pipe section for measurement of the vibration. Preferably for such a defined measurement system modelling of a vibration spectrum can be calculated. For this, the confining elements can be configured to suppress surface vibration at the location, where the confining elements are mounted on the pipe of the pipe-fluid system. And the segment of the pipe building the measurement system can be chosen in such a way, that between the pair of confining elements the pipe is not mechanically coupled to an environment of the pipe, preferably to build a defined measurement system, for which the vibration spectrum can be modelled and calculated.

The excitation of the pipe section to vibration can be done by various solutions, e.g. impact excitation using a periodic device, e.g. solenoid, or manual impact hammer, or continuous excitation using electromagnetic or mechanical devices, or just taking advantage of system vibrations if they are intensive enough.

The pipe-fluid system can include any pipe, which is configured to include a fluid. Such a section of the pipe can be described by characteristic data of the pipe, characterizing geometry and material properties of the pipe-fluid system. Preferably, the pipe section selected for applying the measurement system, which is based on mechanical vibrations, is straight, without junctions or additions.

A confining element for defining of vibration modes can be configured to be coupled to the pipe to delimit a segment of the pipe of the pipe-fluid system for modification of the pipe-fluid system such that a specific mechanical vibration spectrum including a specific mechanical vibration mode can be generated wherein the confining element can be configured to decrease surface vibration deformations, as particularly radial, lateral and bending vibration deformations of the pipe surface at the site where the confining element is coupled to the pipe. The confining element can be configured to be detachably mounted to a pipe and mechanically coupled to the pipe. Vibrations and/or preferably surface vibrations of the pipe at the site where the confining element is coupled are reduced and/or suppressed to define predictable vibration modes of the pipe between the confining elements.

By mechanically coupling the confining elements to the pipe, a section of the pipe is defined for measuring vibration properties, which are accurately predictable by physical calculations. This enables the use of model-based calculation of the physical properties of the fluid in the pipe based on the vibration properties of the pipe-fluid system.

This is not possible for an arbitrary system without such a defined confinement of a measurement section, because an arbitrary system can include flanges, connections, fittings or attachments, which add so much complexity to such a system, that prediction of vibration properties is practically impossible.

The generated mechanical vibration spectrum on a surface of the pipe-fluid system is changed by changes of a fluid inside of the pipe, thereby changing the physical parameter of the pipe-fluid system, enabling to determine parameters and/or conditions of the fluid of the pipe-fluid system using model calculations on vibrations and vibration modes of the pipe based on parameters of the pipe, like material and/or wall thickness and/or diameter of the pipe and/or temperature of the pipe etc. as further discussed below.

The confining elements can be configured to provide an appropriate mechanical impedance matching or impedance jump to the pipe, resulting in the desired reduction of vibration mode amplitude under the confining element. The impedance matching or jump is achieved by the combination of adequate stiffness and/or mass and/or damping of the clamp related to the stiffness and mass of the pipe and can be determined and/or adapted by numerical modelling for any pipe configuration. As a result of the impedance matching/jump the confining clamp will show no relevant radial Eigen-frequencies below the frequencies of the hoop or bending modes of the pipe, which are supposed to be reduced or suppressed.

A distance between the confining elements can define a length of the pipe-fluid system.

Preferably a length of the pipe-fluid system can comprise 5 to 15 times the outer diameter of the pipe. Even more preferably, the length of the pipe-fluid system is between 0.2 m and 1 m.

The confining element can be mechanically coupled to the pipe of the pipe-fluid system at both ends of a pipe section to define a measurement length of the pipe-fluid system. Mechanically coupled to the pipe the confining elements can create a defined nodal point of the vibration at the location of the confining element, similarly to a welded flange, by suppressing radial and bending vibration modes locally all around the circumference of the pipe, wherein a mechanical vibration spectrum of the vibration modes of the pipe section between the confining elements can be used for the determination of the physical parameter. Using other words, the vibration of the pipe at the site of the confining element is reduced in such a way that a distance between the confining elements defines predictable vibration modes, which can be excited. The reduction and/or suppression of the vibration of the pipe can be preferably implemented in a manner, which influences the vibration quality factor to a minimal amount. The confining elements additionally can exclude vibration damping effects as well as vibration sources generated in pipe areas outside the pipe-fluid system, helping to improve the vibration signal quality compared to a measurement on an arbitrary pipe without confining elements coupled to the pipe.

Using these confining elements defines a pipe-fluid system at any industrial pipe system at a section of the pipe, which has a defined length and well-defined boundary conditions at both ends and along the complete length. This enables an accurate prediction of frequencies of a mechanical vibration spectrum of at least a vibration mode, which can be sensitive to physical parameters, as e.g. a density of the fluid of the pipe-fluid system. The respective sensitive mode can be determined using analytic or finite element modeling calculations. The confining elements help to exclude attenuations from existing components of the pipe system, as e.g. threaded connections, mounted clamps and ducts, etc. Additionally, the confining element can be used as defined support for an excitation and/or a sensing component needed for the frequency analysis method for determining the physical parameter, as e.g. a density or a viscosity measurement.

The pipe-fluid system defines a pipe section of an existing pipe system, which is free of any mechanically attached structures like clamps, attachments, flanges, junctions etc. The pipe-fluid system can be already free of any attachments in first place or the attachments can be stripped to define a pipe-fluid system. The length of the pipe-fluid system can be chosen to be typically more than 5 times the outer diameter of the pipe, favorably about 10 times the outer diameter of the pipe. For practical reasons, especially for large diameters of the pipe, the length can be limited to not exceed 1 m, preferably not more than 50 cm.

The pipe-fluid system is preferably defined on a straight part of the pipe, but bends of the pipe can be included. Preferably, the section of the pipe defining the pipe-fluid system has a constant cross-section and a constant wall thickness along the complete measurement length. Influence of boundary conditions outside of the pipe-fluid system can be suppressed by using the confining elements defining the pipe-fluid system.

Defining a pipe-fluid system using a pair of confining elements enables an accurate prediction of a vibration behavior of the confined pipe section as function of physical properties of the enclosed fluid, e.g. density, viscosity or flow, by creating defined boundary conditions for the vibrating pipe section. The definition of the pipe-fluid system is realized by confining elements having a specific design, including a fixation element and a supporting frame. The fixation element, as e.g. a contact ring, suppresses essentially most radial movements, i.e. most radial and bending vibration components of the pipe surface at the location of the confining element, creating a good approximation of a local nodal point of the vibration. The circumferential fixation element can be a ring having sufficient width for reducing axial bending vibrations, or at least two continuous cutting edges with a line contact to the pipe, or at least two rings of discrete support pins. In the latter case, the minimum number of discrete support pins is related to a vibration mode used for determination of the physical property, specifically to the number of vibrational nodes around the circumference. A supporting frame of the confining element can serve as a positioning and alignment device of the fixation element and can provide the required stiffness of the structure of the confining element.

Using the described measurement system for determining a physical parameter of the pipe-fluid system provides means for determining, e.g. a fluid density in process pipes in a simple, robust, non-invasive manner based on the vibration spectrum analysis of the pipe-fluid system, offering a solution at acceptable cost and with simple installation an minimum calibration needs for increased use of density measurement for process monitoring and optimization.

By this, the measurement system as described can be used to determine a physical parameter of the pipe-fluid system without a need of a priori knowledge of a correlation between a vibration spectrum of a pipe-fluid system and the physical property of the fluid inside, as for an arbitrary industrial pipe system, including attachments and flanges, is needed. That is because the pipe-fluid system, by using a pair of confining elements, forms a definite system. This definite measurement system can overcome a requirement of an in-situ calibration for at least two calibration points for each physical property to be considered.

Using other words the described measurement system for determining a physical parameter is using vibration modes, which are sensitive to physical properties of the fluid, like a density or a pressure, which are summarized under the denomination of "hoop vibration modes".

Advantageously the measurement system provides a solution, by which a measurement section of desired length and well-defined boundary conditions is confined within any industrial piping system. This can enable determining physical parameters, as e.g. density or viscosity of the fluid of the pipe-fluid system by analysis of a mechanical vibration spectrum of an arbitrary pipe generated by the excitation system.

According to an aspect, the measurement system includes a temperature sensor, configured to determine a temperature of the outer surface of the pipe-fluid system.

According to an aspect, the measurement system includes a determination electronic, configured to determine the physical parameter of the pipe-fluid system based on the provided mechanical vibration spectrum, wherein the determination electronic is connected by electrical signals to the vibration measurement system and/or connected by electrical signals to the temperature sensor.

That means the determination electronic unit is configured to determine the physical property of the fluid of the pipe-fluid system by vibration frequency changes within the mechanical vibration spectrum, preferably using selected vibration modes and sensitivities determined from known elastic and geometric properties of the pipe-fluid system.

According to an aspect, the measurement system includes an input/output interface to input characteristic data of the pipe of the pipe-fluid system and/or process-fluid data of the pipe-fluid system and/or to output the physical parameter of the pipe-fluid system.

According to an aspect, the measurement system includes a support structure, e.g. a cantilever beam, configured to carry the excitation system and enabling the excitation system to generate the mechanical excitation pulse; and/or a protective housing enclosing the pair of confining elements; and the vibration measurement system; and the excitation system.

The protective housing shields the measurement system against external disturbances and external influences on its vibration behavior, e.g. by attenuating contact or contamination of the measurement section, damage to excitation and sensors, external noise, etc. This is a way to create defined and stable boundary conditions for the vibrating pipe along its complete length of the pipe-fluid system. The housing can be mounted surrounding the pipe outside the confined measurement section to prevent any mechanical coupling between the confining clamps, which might affect the vibration response, i.e. the mechanical vibration spectrum.

The confining elements can include a cantilever beam to carry means for excitation of vibrations, as e.g. a solenoid coil carrying an impact hammer, or other excitation means. Alternatively or additionally, the confining element can include a cantilever beam to carry sensing devices for measuring of mechanical vibrations of the pipe within the length of the pipe-fluid system, as e.g. an accelerometer or a microphone.

According to another aspect a confining element for decreasing surface vibration deformations, as e.g. radial and/or lateral and/or bending vibration deformations, of the pipe surface of a pipe-fluid system is proposed, which includes a supporting frame configured to be detachable mounted at a pipe of the pipe-fluid system; and a fixation element configured to be detachable mounted for mechanically coupling the supporting frame with an outer surface of the pipe.

That means that the confining element, as e.g. a clamp, for decreasing hoop modes at an outer surface of the pipe-fluid system is configured to be detachable from the pipe.

The fixation element which suppresses vibrations over a certain length of pipe, is configured to be detachably coupled to the pipe and configured to have that close contact to a surface of the pipe around a circumference of the pipe.

The fixation element can be configured to be continuous along the circumference, as e.g. with (semi-)circular cutting edges and/or include discrete support pins along a circumferential line. Discrete support pins are easy to realize and suited to cope with roundness tolerances, e.g. by using stud screws. The discrete support pins can preferably be, but not necessarily need to be equidistant arranged around the circumference surface of the pipe.

Discrete support pins used as fixation element can be adapted to the vibration mode to be suppressed. E.g. for the so-called n2 mode, with four nodes around the circumference of the pipe, at least 4×n=8 support pins are needed to successfully suppress this vibration mode. Accordingly, for higher vibration modes, more support pins are needed, always corresponding to at least four times the order of the vibration mode.

If the fixation element is realized using discrete support pins, then the support pins can preferably be aligned, i.e. the plurality of support pins arranged to build rings, can be positioned at the same angular position relative to the pipe, within both confining elements with respect to each other. Preferably a support pin should also be aligned with the position of the excitation force.

The fixation element is supported and held in place by a supporting frame, providing a twofold function:

Stiffly connect and align all components of the fixation element, especially in case of two separate contact rings and of discrete support pins, in order to prevent any relative radial displacement of the pipe circumferences at all contact points with the pipe surface.

The circumferential, preferably bending, stiffness of the frame ensures that circumferential vibration is strongly reduced or suppressed under the mechanical coupling area of the fixation element.

The axial bending stiffness of the frame ensures that the two contact rings within one confining element are fixed in the same plane, and so no bending mode components, as e.g. m-modes, are passing "through" the confining element, i.e. a node regarding longitudinal bending vibrations is created under the confining clamp.

Provide a defined mass and stiffness stiffly connected to the fixation element, raising the Eigen-frequency of the confining element significantly above that of the pipe vibration frequencies to be measured. This ensures that the relevant pipe vibration modes are suppressed to a great degree.

The supporting frame is configured to be detachable to enable a mounting of the confining element enclosing the pipe of the pipe-fluid system, providing sufficient stiffness and coupling force for clamping. The supporting frame includes at least two segments to enable mounting on existing pipes, but additionally or alternatively the supporting frame can include a plurality of segments. The segments can be joined by hinges, latches, form fitting, as e.g. using a dovetail, or bolted connections.

The supporting frame can be configured to provide sufficient stiffness for the mechanical coupling of the fixation element with the outer surface of the pipe. The supporting frame can be configured to provide a sufficient mass, which at least corresponds to the mass of the pipe segment, which is mechanically coupled with the fixation element, to reduce and/or suppress any radial movement of the pipe surface along the clamping lines defined by the fixation element at the pipe surface to define a vibration mode.

The fixation element can be mechanically coupled to the pipe to reduce local vibrations of the pipe at the coupling site with the pipe and can be configured to reduce and/or suppress local vibrations of the pipe within an extension along the pipe, which corresponds at least to the thickness of the pipe.

According to an aspect, the supporting frame of the confining element is configured to be detachable mounted at the pipe by means of a number of frame elements, wherein the frame elements are configured to be mechanically joined to build the supporting frame; and the supporting frame is configured to include the outer surface of the pipe.

According to an aspect, the fixation element of the confining element comprises a contact ring and/or a pair of contact rings and/or a pair of cutting edge rings.

The contact ring, which is mechanical supported by the supporting frame, is configured to be mechanically coupled to the surface of the pipe to suppress or at least reduce radial vibrations of the pipe, e.g. movements of the pipe surface, around the complete circumference of the pipe and can have a width equaling the pipe wall diameter.

Alternatively or additionally, the fixation element of the confining element includes a pair of separate and essentially parallel contact rings and/or cutting edge rings with essential line contact to the pipe, along which the pipe is clamped tightly in linear contact, preventing any radial movement of the pipe surface along these lines. A distance between the two essentially parallel contact rings and/or cutting edge rings corresponds to or exceeds at least one pipe wall thickness to create nodal points on the surface of the pipe with regard to the longitudinal bending vibration modes to be measured.

According to an aspect an axial thickness of the contact ring and/or a distance between the pair of contact rings and/or a distance between the pair of cutting edge rings corresponds to at least a wall thickness of the pipe, and preferably at least a thickness of two times the wall-thickness of the pipe, of the pipe-fluid system.

To extend the coupling of the individual fixation element along the pipe within a distance corresponding to the wall thickness of the pipe can reduce the local vibration of the pipe surface effectively for increasing the accuracy of the determination of the physical parameter by clearly defining vibration nodes at the site of the confining element.

According to an aspect the fixation element of the confining element includes a plurality of discrete support pins, which are arranged between the supporting frame and the outer surface of the pipe to mechanically couple the supporting frame to the outer surface of the pipe for decreasing the surface vibration deformations, as e.g. radial, lateral and bending vibration deformations of the pipe surface of the pipe-fluid system.

Such plurality of discrete support pins can be arranged in at least two parallel rows around the circumference of the pipe and supported by the support frame. Thereby the number of support pins within each individual row can be at least four times the mode number n of the vibration mode, which is intended to be suppressed locally at the site of the confining element. For instance, if a mode number is n2, this mode includes four nodes, resulting in a number of 8 pins.

According to an aspect, the fixation element of the confining element is mechanically coupled to the supporting frame using thermal compensation elements for compensation of the mechanical coupling in respect to a thermal expansion of the pipe and/or wherein the fixation element is mechanically coupled to at least one tuning mass.

Using thermal expansion compensation elements enable compensation of thermal expansion differences between the pipe and the confining element. This compensation can help keep the mechanical coupling of the confining element and the outer surface of the pipe constant to improve the determination of the physical parameter irrespective of temperature changes, because differences in the mechanical coupling can influence the vibration behavior of the pipe.

E.g., springs with high stiffness for supporting each support pin coupling the support frame with the support pin can adjust the contact force of the individual support pins with the pipe surface. Alternatively or additionally frame segments can be coupled using springs at the joints between the frame segments to adjust the force of the coupling of the segments and by this providing an overall elasticity or compliance of the support frame. Alternatively or additionally, the support frame can be tailored to a defined compliance to allow for thermal expansion compensation without sacrificing the vibration suppression effect.

According to an aspect, the confining element includes a sensor for determination of a strength of the mechanical coupling between the supporting frame and the outer surface of the pipe via the fixation element.

Using temperature sensor systems and/or force sensor systems enables to monitor thermal expansion and resulting modified clamping forces of the coupling between the confining elements and the pipe, which can influence the determination of the physical parameter. This information can then be used to compensate for variations of the coupling, leading to higher accuracy of the measurement.

According to an aspect the confining element includes active elements for adjusting the strength of the mechanical coupling between the supporting frame and the outer surface of the pipe.

This adjustment can be used to compensate for thermal expansion of the pipe diameter.

Using active elements, as e.g. piezo-actors, heating elements, etc., for adjusting the strength of the mechanical coupling enables e.g. an adjustment of a contact force and effective stiffness of the supporting points with the surface of the pipe.

According to an aspect, the confining element includes a temperature sensor for determination of a temperature of the outer surface of the pipe.

Because the temperature of material of the pipe influences the vibration of the pipe, knowing the temperature can increase the accuracy of the determined physical parameter.

According to another aspect a kit of parts include the features of the measurement system according to the measurement system described above, preferably including a confining element as described above.

Advantageously such a kit of parts enables an operator to set up the measurement system at any arbitrary pipe system for determining physical parameters of the respective pipe-fluid system.

According to an aspect a use of a confining element as described above is proposed, for a measurement system as described above.

Using the confining element as described can increase the accuracy of the measurement result using the measurement system as described above, by precisely defining a length of the pipe for developing vibration modes.

A method for determining a physical parameter of a pipe-fluid system is provided, including the following steps. In one step a pipe within a pipe-fluid system is provided, with known characteristics, as e.g. material data and/or a geometry of the system, especially with defined length, as defined by a distance between confining elements.

In a further step, a mechanical model vibration spectrum of the pipe-fluid system is calculated using analytic or preferably more accurate finite element (FEM) calculations.

In a further step, the sensitivity of selected vibration modes of the pipe section within the pipe-fluid system to changes of physical properties of the fluid inside, (e.g. density, pressure) is calculated e.g. using FEM or analytical calculations.

For this, the vibration spectrum for different densities or pressures is calculated and the sensitivity is defined as the change of frequency divided by the change in physical property.

In a further step, a mechanical vibration spectrum of the pipe-fluid system is provided, which is generated by excitation of the pipe-fluid system, and the selected vibration modes predicted in the mechanical model are identified.

In the same step, process-fluid data, as e.g. temperature and/or pressure, are provided by real-time measurement.

In a further step, the identified frequency(ies) of the measurement mode(s) are correlated to the initial state of the physical quantity, as e.g. a density of the fluid and/or a pressure of the fluid and/or a temperature and they are defined as initial state. The initial value of the physical quantity is preferably derived from dedicated measurements, as e.g. probe extraction for density of the fluid, but can also be a qualified estimation based on information on the process.

In a further step, continuously or intermittently pipe vibrations are excited and the vibration spectrum is measured, including extraction of the measurement mode frequencies. Additionally or alternatively, physical properties of the fluid-pipe system can be measured, as e.g. temperature of the fluid and/or the pipe and/or a pressure of the fluid.

In a further step, the change of the physical property relative to the initial value is calculated based on the change of frequency, the above defined sensitivity and the real-time process-fluid data, as e.g. pressure of the fluid and/or a temperature of the fluid and/or the pipe.

A method to measure the frequency of the vibration can include the following steps:

In a first step a section of the pipe of the pipe-fluid system is selected. At a next step a geometry and/or material data, as for instance a length of the segment of the pipe-fluid system and/or diameter of the pipe and/or a wall thickness of the pipe and/or a young's modulus of the material of the pipe, is determined. At a next step frequency and sensitivity prediction calculation are performed for the pipe of the pipe-fluid system using a FEM and/or an analytic model to provide an output with a frequency of a selected mode at a reference temperature and a sensitivity of a value of the frequency in respect to changes of the density of the fluid and/or of a pressure change of the fluid. In a next step confining clamps are mounted and a system to excite vibrations of the pipe is mounted and a vibration sensor for determining vibrations of the pipe is mounted. An electronic device is connected to the vibration sensor for signal processing and determining the physical parameters.

In a further step, vibrations of the pipe are generated using the system to excite vibrations and a vibration spectrum is determined. A temperature of the pipe is determined and at least a relevant frequency of vibration modes is extracted from the vibration spectrum to define parameters as a starting point. In a further step a density of the fluid of the pipe-fluid system is determined, for instance by probe extraction, and stored as an initial and/or a calibration density together with the extracted frequency of the initial vibration spectrum. In a further step, vibrations of the pipe-fluid system are continuously generated and at least a related frequency of at least a relevant mode is extracted from the vibration spectrum. A temperature of the pipe-fluid system is continuously measured and optionally a pressure of the section of the pipe is determined. In a further step, physical parameters, as for instance a density change of the fluid relative to the initial state is calculated using the frequency change and the predetermined sensitivity to temperature and pressure changes.

A mechanical model vibration spectrum includes a part or several parts of a complete mechanical vibration spectrum of the pipe-fluid system, including a pipe, wherein the pipe can be filled partially or complete by a fluid, like a gas and/or a liquid and/or a mixture and/or a slurry.

Any individual vibration mode depends on geometry data of the pipe and/or material properties of the pipe, temperature of the pipe and inside pressure of the pipe and the process-fluid data of the pipe-fluid system.

Alternatively or additionally, the mechanical vibration spectrum can include a plurality of different vibration modes for determining the physical parameter, e.g. a density, of the fluid within the pipe.

The accuracy and reliability of the determination can be improved, if data for at least two different modes of the mechanical vibration spectrum are used, i.e. measurements for at least two different vibration modes are performed. In this case, an "acceptance criteria" for estimating the density or other physical parameters of the fluid have to be fulfilled by both vibration modes, thereby increasing the reliability of the determination.

The mechanical excitation includes any mechanical excitation including a pulse impacting the outer surface of the pipe of the pipe-fluid system.

In a further step of the method, the determined physical parameter can be output, for instance using an interface and/or a screen. This output of the determined physical parameter can include a most likely fluid density.

Alternatively or additionally, the method includes the step of continuously evaluating a frequency peak shift of the mechanical vibration spectrum and determines the corresponding physical parameter, as e.g. a density of the fluid.

Alternatively or additionally the method includes a provision of a further mechanical vibration spectrum at a later time, wherein the provided mechanical vibration spectrum at a prior time can be used as a reference measurement, which is calibrated with a one-time probe extraction and an off-line density measurement to increase the accuracy of the determination of the physical parameter, e.g. the density of the fluid of the pipe-fluid system.

The pipe-fluid system can be any pipe, which is configured to include a fluid. Preferably, the pipe-fluid system can be a pipe, which is configured to include a fluid, and can comprise vibration mode confining elements, which help to define a vibration mode of the pipe of the pipe-fluid system within a defined section of the pipe. Such a section of the pipe can be described by characteristic data of the pipe, characterizing geometry and material properties of the pipe. Preferably, the pipe section is straight, without junctions or additions.

Each individual confining element can be any flange connected to the pipe like a welded flange and/or a butt-welded flanges and/or threaded connections. Alternatively or additionally at least one of the confining elements can be a confining element configured to be mechanically coupled to the pipe to delimit a segment of the pipe of the pipe-fluid system in respect to vibration modes, for modification of the pipe-fluid system such that a specific mechanical vibration spectrum including a specific mechanical vibration mode can be generated.

A distance between the confining elements can define a length of the pipe-fluid system.

The characteristic data of a pipe of a pipe-fluid system can include geometry data of the pipe and/or the pipe-fluid system, which can be generated by local measurements, and/or provided by technical data, and/or data on the material of the pipe and/or an expected frequency range and/or an expected vibration frequency spectrum and/or a pipe surface temperature.

The process-fluid data can include and expected density of the fluid and/or a fluid pressure value and/or a fluid temperature and/or an expected fluid.

The mechanical model vibration spectrum can be provided by a theoretical model for the pipe-fluid system, preferably using finite element calculations.

Using other words, a method for determining of a density and/or a change of the density of a process fluid within a pipe is described. The mechanical vibration spectrum of the pipe-fluid system can be generated by exciting the pipe-fluid system to vibrate and an excitation response is measured to derive a quantitative value for changes of physical properties of the fluid in the pipe using the change of measured vibration characteristics, e.g. a vibration frequency and pre-calculated sensitivity of the frequency to physical property change. The determination of the physical parameter based on the measured vibration characteristics can be done using an algorithm, based on the vibration characteristics and/or on measurements of pipe geometries and/or with knowledge or estimation of pipe material properties and/or a measured pipe surface temperature modeling means for provision of a interdependence of a vibration characteristics and physical properties, as a function of the above parameters.

According to an aspect, a length of the pipe-fluid system is delimited by vibration mode confining elements at both ends of the pipe-fluid system.

Using such confining elements mechanically coupled to the pipe of the pipe-fluid system can increase the accuracy and provide a pipe-fluid system with a specific dimension for generation of a desired mechanical vibration spectrum.

According to an aspect, the mechanical vibration spectrum of the pipe-fluid system is provided by an acoustic signal acquisition system acoustically coupled to the pipe-fluid system and/or a vibration measurement system mechanically coupled to the outer surface of the pipe-fluid system.

According to an aspect, the method includes filtering of the provided vibration spectrum, using the process-fluid data and the model vibration spectrum corresponding to the process-fluid data.

The filtering can limit the frequency range of the provided vibration spectrum in respect to an upper and a lower frequency value depending on the process-fluid data and the model vibration spectrum corresponding to the process-fluid data. This limitation to a predicted frequency range based on the initial FEM calculation eases the identification of the relevant vibration mode in the actually measured spectrum.

According to an aspect, the method includes providing a temperature of the outer surface of the pipe-fluid system and determining the mechanical model vibration spectrum additionally based on the temperature of the outer surface of the pipe-fluid system.

Advantageously the determined temperature of the outer surface of the pipe-fluid system increases the accuracy in comparison to an estimated temperature of the fluid and/or the temperature of the pipe material of the pipe-fluid system.

According to an aspect, the method includes providing an internal pressure of the pipe-fluid system and determining the mechanical model vibration spectrum additionally based on the internal pressure of the pipe-fluid system.

Advantageously the determined internal pressure of the pipe-fluid system increases the accuracy in comparison to an estimated pressure of the fluid.

According to an aspect, the physical parameter includes a density of the process-fluid of the pipe-fluid system and/or a viscosity of the process-fluid of the pipe-fluid system and/or a flow of the process-fluid of the pipe-fluid system.

For determining of the viscosity of the process fluid at least, parts of the mechanical vibration spectrum are compared in respect to a form of the spectrum, e.g. the width of a peak or ringdown time to a mechanical model vibration spectrum.

According to an aspect, the characteristic data of the pipe of the pipe-fluid system includes a diameter of the pipe and/or a thickness of the pipe and/or a material of the pipe of the pipe-fluid system and/or a length of the pipe-fluid system and/or elastic material data of the pipe wall.

According to an aspect, the theoretical model for the vibration spectrum of the pipe-fluid system is based on a finite-element calculation or analytic model calculation of the pipe-fluid system used for measurement.

Advantageously the determining of the theoretical model for the vibration spectrum based on a finite-element calculation can improve the accuracy.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising,"

"having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A measurement system for determining a physical parameter of a pipe-fluid system, comprising:
   a pair of confining elements configured to decrease surface vibration deformations at an outer surface of each end of the pipe-fluid system, wherein each confining element comprises a supporting frame configured to be detachably mounted on a pipe of the pipe-fluid system;
   a fixation element configured to be detachably mounted for mechanically coupling the supporting frame with an outer surface of the pipe;
   an excitation system, configured to generate a mechanical vibration spectrum at a surface of the pipe-fluid system;
   a vibration measurement device configured to be mechanically coupled to an outer surface of the pipe-fluid system, and configured to provide a mechanical vibration spectrum of the pipe-fluid system;
   a support structure, configured to carry the excitation system and enabling the excitation system to generate the mechanical excitation; and
   a protective housing enclosing the pair of confining elements, an acceleration acquisition system, and the excitation system.

2. The measurement system of claim 1, according to the preceding claim, further comprising a temperature sensor, configured to determine a temperature of the outer surface of the pipe-fluid system.

3. The measurement system of claim 1, further comprising a determination electronics, configured to determine the physical parameter of the pipe-fluid system based on the provided mechanical vibration spectrum, wherein the determination electronic is connected by electrical signals to an acceleration acquisition system and is further connected by electrical signals to the temperature sensor.

4. The measurement system of claim 1, further comprising an input/output interface operating and configured to input characteristic data of the pipe of the pipe-fluid system and process-fluid data of the pipe-fluid system, and to output the physical parameter of the pipe-fluid system.

5. The measurement system of claim 1, wherein the supporting frame is configured to be detachably mounted on the pipe by means of a number of frame elements, wherein the frame elements are configured to be mechanically joined to build the supporting frame; and the supporting frame configured to include the outer surface of the pipe.

6. The measurement system of claim 1, wherein the fixation element comprises at least one of a contact ring, a pair of contact rings, and a pair of cutting edge rings.

7. The measurement system of claim 6, wherein at least one of an axial thickness of the contact ring, a distance between the pair of contact rings, and a distance between the pair of cutting edge rings corresponds to at least a wall-thickness of the pipe.

8. The measurement system of claim 7, wherein the at least one of an axial thickness of the contact ring, a distance between the pair of contact rings, and a distance between the pair of cutting edge rings corresponds to at least a thickness of two times the wall-thickness of the pipe, of the pipe-fluid system.

9. The measurement system of claim 1, wherein the fixation element comprises a plurality of discrete support pins, which are arranged between the supporting frame and the outer surface of the pipe to mechanically couple the supporting frame to the outer surface of the pipe for decreasing surface vibration deformations of the pipe-fluid system.

10. The measurement system of claim 1, wherein the fixation element is mechanically coupled to the supporting frame using thermal compensation elements for compensation of the mechanical coupling in respect to a thermal expansion of the pipe, and wherein the fixation element is mechanically coupled to at least one tuning mass.

11. A measurement system for determining a physical parameter of a pipe-fluid system, comprising:
    a pair of confining elements configured to decrease surface vibration deformations at an outer surface of each end of the pipe-fluid system, wherein each confining element comprises a supporting frame configured to be detachably mounted on a pipe of the pipe-fluid system, and at least one confining element of the pair of confining elements comprises a sensor for determination of a strength of a mechanical coupling between the supporting frame and the outer surface of the pipe via the fixation element;
    a fixation element configured to be detachably mounted for mechanically coupling the supporting frame with an outer surface of the pipe;
    an excitation system, configured to generate a mechanical vibration spectrum at a surface of the pipe-fluid system; and
    a vibration measurement device configured to be mechanically coupled to an outer surface of the pipe-fluid system, and configured to provide a mechanical vibration spectrum of the pipe-fluid system.

12. A measurement system for determining a physical parameter of a pipe-fluid system, comprising:
    a pair of confining elements configured to decrease surface vibration deformations at an outer surface of each end of the pipe-fluid system, wherein each confining element comprises a supporting frame configured to be detachably mounted on a pipe of the pipe-fluid system, and at least one confining element of the pair of the pair of confining elements comprises active elements for adjusting the strength of a mechanical coupling between the supporting frame and the outer surface of the pipe;
a fixation element configured to be detachably mounted for mechanically coupling the supporting frame with an outer surface of the pipe;
an excitation system, configured to generate a mechanical vibration spectrum at a surface of the pipe-fluid system; and
a vibration measurement device configured to be mechanically coupled to an outer surface of the pipe-fluid system, and configured to provide a mechanical vibration spectrum of the pipe-fluid system.

* * * * *